(12) United States Patent
Takagi

(10) Patent No.: US 8,799,727 B2
(45) Date of Patent: Aug. 5, 2014

(54) ARITHMETIC PROCESSING APPARATUS AND METHOD OF CONTROLLING ARITHMETIC PROCESSING APPARATUS

(71) Applicant: Fujitsu Limited, Kawasaki (JP)

(72) Inventor: Noriko Takagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 54 days.

(21) Appl. No.: 13/736,238

(22) Filed: Jan. 8, 2013

(65) Prior Publication Data
US 2013/0246868 A1    Sep. 19, 2013

(30) Foreign Application Priority Data

Mar. 19, 2012    (JP) .................................. 2012-062897

(51) Int. Cl.
*G11C 29/00*    (2006.01)
*G06F 13/00*    (2006.01)
*G06F 11/10*    (2006.01)

(52) U.S. Cl.
CPC .................................. *G06F 11/1064* (2013.01)
USPC ............................ 714/723; 714/763; 711/113

(58) Field of Classification Search
CPC . G06F 11/1064; G06F 11/1048; G06F 29/12; G06F 12/0223; G11C 29/44
USPC ........ 714/723, 763, 718–719, 799, 819, 6.13, 714/6.2, 6.21, 6.22, 42, 47.1, 54; 711/113, 711/112, 111, 100
See application file for complete search history.

(56) References Cited

U.S. PATENT DOCUMENTS

| | | | | |
|---|---|---|---|---|
| 5,778,171 A | * | 7/1998 | Rahman et al. | 714/53 |
| 7,890,836 B2 | * | 2/2011 | Eilert | 714/758 |
| 8,271,853 B2 | * | 9/2012 | Kanai et al. | 714/763 |
| 2008/0294847 A1 | | 11/2008 | Maruyama et al. | |
| 2013/0339808 A1 | * | 12/2013 | Ambroladze et al. | 714/54 |

FOREIGN PATENT DOCUMENTS

JP    4392049    10/2009
JP    2011-008491 A    1/2011

* cited by examiner

*Primary Examiner* — Christine Tu
(74) *Attorney, Agent, or Firm* — Fujitsu Patent Center

(57) ABSTRACT

An arithmetic processing apparatus includes a cache memory to store data in cache lines, an error detecting unit to detect an error occurring in one of the cache lines, a way comparing unit to compare way identification information of a cache line to be accessed with error-way identification information, a word comparing unit to compare a word address of the cache line to be accessed with an error word address, a column comparing unit to compare a column address of the cache line to be accessed with an error column address, and a control unit to disable all cache lines sharing a failed word line in response to results of comparisons made by the way comparing unit, the word comparing unit, and the column comparing unit when the error detecting unit detects a second error occurring in any one of the cache lines after the occurrence of the first error.

6 Claims, 7 Drawing Sheets

ARITHMETIC PROCESSING APPARATUS AND METHOD OF CONTROLLING ARITHMETIC PROCESSING APPARATUS

CROSS-REFERENCE TO RELATED APPLICATIONS

The present application is based upon and claims the benefit of priority from the prior Japanese Patent Application No. 2012-062897 filed on Mar. 19, 2012, with the Japanese Patent Office, the entire contents of which are incorporated herein by reference.

FIELD

The disclosures herein relate to an arithmetic processing apparatus and a method of controlling an arithmetic processing apparatus.

BACKGROUND

Along with size reduction achieved by the semiconductor technology, an error rate of the errors occurring in a cache RAM (random access memory) has been increasing. A RAM has a plurality or bit lines extending in a vertical direction and a plurality of word lines extending in a horizontal direction, and a one-bit memory cell is disposed at each intersection of these lines. In order to read data from the RAM, a word line address (i.e., word address) and a bit line address (i.e., column address) are specified to read data located at the specified intersection.

As a result of reduction in the distance between word lines due to reduction in the size of semiconductor devices, a word line failure is more likely to occur in RAMs due to short-circuiting or the like. With the occurrence of a word line failure, access to all the memory cells that are read and written by this word line results in an error. For example, a 4-column cache RAM may be configured such that one access address in the RAM corresponds to one cache line. In this case, four access addresses in the RAM that correspond to the same word line and different column addresses share one word line, so that four cache lines share one word line. When such a cache RAM suffers a word line failure, access results in an error with respect to all the bits associated with the four access addresses sharing the failed word line in the RAM. In this case, the four cache lines corresponding to these four access addresses in the RAM are not usable.

Several technologies are known as a method of recovering from a cache RAM error. A cache control unit may be provided with a plurality of operation bits which are assigned to respective lines in the cache memory (Paten Document 1, for example). These operation bits indicate whether the cache memory is properly operating, and are set to "valid" in the case of the normal operation state. Upon an error being detected, an operation bit assigned to the failed line is set to "invalid". At the time of accessing the cache, a check is made whether all the operation bits of the line to which the data to be accessed belongs indicate "valid". When the operation bits indicate "valid", the cache memory is accessed. When the operation bits indicate "invalid", an external memory, rather than the cache memory, is accessed.

In another example, a monitoring register may be provided to store a cache line address and a cache way that have failed (Patent Document 2, for example). Upon detecting a failure, the monitoring register stores the failed address and failed way, and, also, the relevant cache line is disabled. At the time of accessing a cache memory, the cache line address that is to be accessed is compared with the cache line address stored in the monitoring register. A match between these addresses indicates that the failed cache line is to be accessed. When the failed cache line is to be accessed, device control (i.e., block delete) is performed to store data in a way that is different from the failed way indicated by the monitoring register. With respect to the way stored in the monitoring register, another cache line may fail. In such a case, the entirety of the way is made obsolete (i.e., way-delete), and operations continue by use of the remaining ways.

In the configuration, disclosed in Patent Document 1, cache lines may be made obsolete on a line-specific basis, so that recovery can be made from a word line failure. However, operation bits are provided for respective cache lines, which results in an increase in circuit size.

In the configuration disclosed in Patent Document 2, the block delete can provide recovery from a failure of a single cache line. The block delete cannot provide recovery from a word line failure in which a plurality of cache lines fail at the same time. Further, the way delete can provide recovery from a word line failure. Since an excessively large area (i.e., the entirety of one way) is made obsolete, however, a significant drop in performance may needlessly occur.

[Patent Document 1] Japanese Laid-open Patent Publication No. 2011-8491
[Patent Document 2] Japanese Patent No. 4392049

SUMMARY

According to an aspect of the embodiment, an arithmetic processing apparatus for connection to a memory device that stores data includes an instruction processing unit to output a memory access request, a cache memory to store part of data stored in the memory device in plural cache lines provided for a plurality of ways, an error detecting unit to detect an error occurring in one of the cache lines, an error-way register to store error-way identification information indicative of a way to which a cache line having a first error belongs when the error detecting unit detects the first error occurring in the cache line that is one of the cache lines, an error-word-address register to store an error word address that is a word address of the cache line having the first error, an error-column-address register to store an error column address that is a column address of the cache line having the first error, a way comparing unit to compare way identification information of a cache line to be accessed with the error-way identification information, a word comparing unit to compare a word address of the cache line to be accessed with the error word address, a column comparing unit to compare a column address of the cache line to be accessed with the error column address, and a control unit to disable all cache lines sharing a failed word line in response to results of comparisons made by the way comparing unit, the word comparing unit, and the column comparing unit when the error detecting unit detects a second error occurring in any one of the cache lines in response to the memory access request after the occurrence of the first error.

A method of controlling an arithmetic processing apparatus, which is connected to a memory device storing data and includes an instruction processing unit to output a memory access request and a cache memory to store part of the data stored in the memory device in plural cache lines provided for a plurality of ways, includes detecting a first error occurring in a cache line that is one of the cache lines, storing, in an error-way register in response to the defection of the first error, error-way identification information indicative of a way to which the cache line having the first error belongs, storing, in an error-word-address register in response to the detection of the first error, an error word address that is a word address of the cache line having the first error, storing, in an error-column-address register in response to the detection of the first error, an error column address that is a column address of the cache line having the first error, detecting a second error occurring in any one of the cache lines, and disabling, in response to the detection of the second error, all cache lines sharing a failed word line in response to a first result obtained by comparing way identification information of a cache line to be accessed with the error-way identification information, a second result obtained by comparing a word address of the cache line to be accessed with the error word address, and a third result obtained by comparing a column address of the cache line to be accessed with the error column address.

The object and advantages of the embodiment will be realised and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

In the following, embodiments of the invention will be described with reference to the accompanying drawings.

Figure 1:
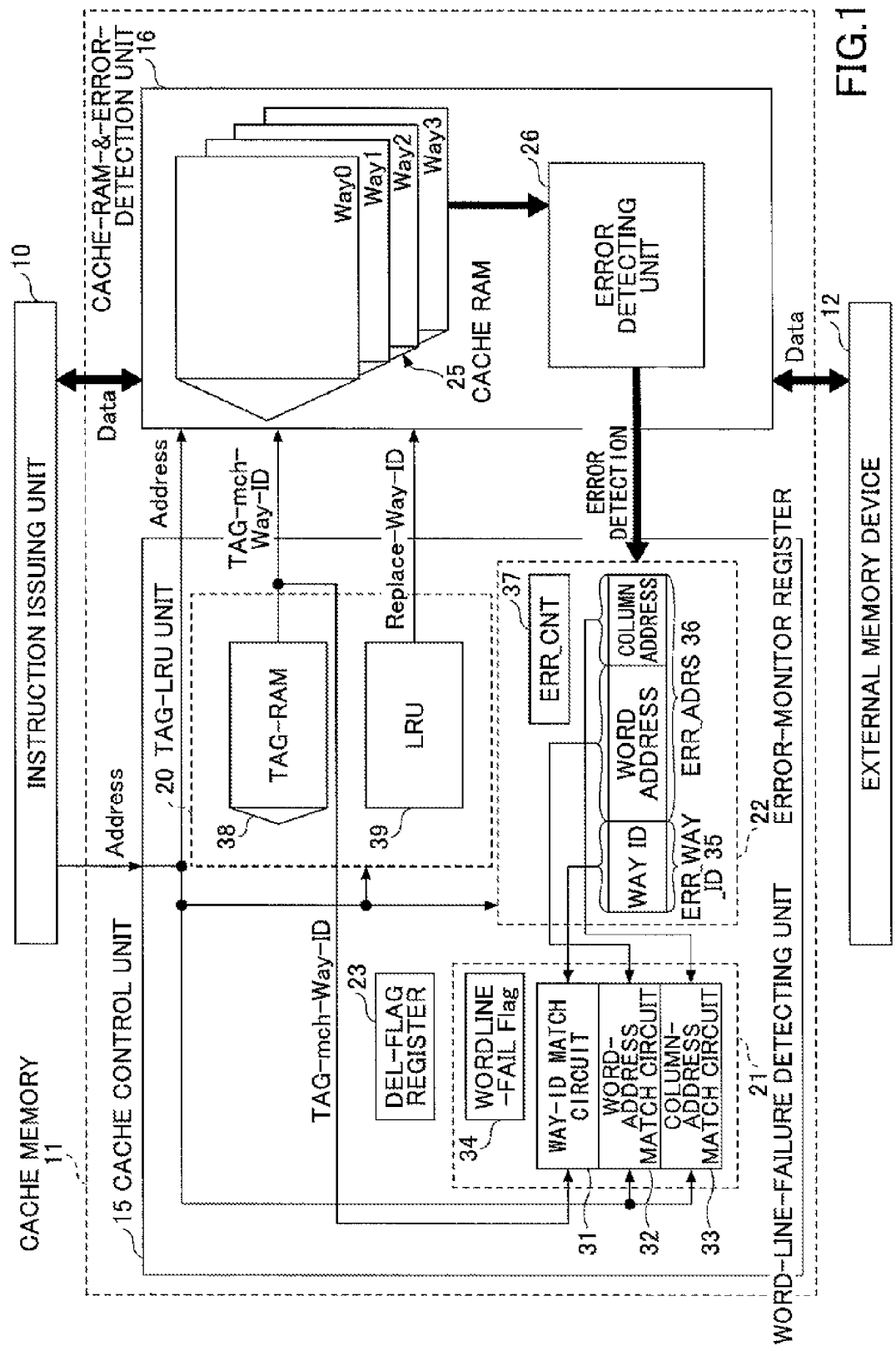
FIG. 1 is a drawing illustrating an example of the configuration of an arithmetic processing apparatus.

FIG. 1 is a drawing illustrating an example of the configuration of an arithmetic processing apparatus. The arithmetic processing apparatus includes an instruction issuing unit 10 and a cache memory 11, and is connected to an external memory device 12. The instruction issuing unit 10 transmits a memory access request to the cache memory 11. In the case of the memory access request being a data write request, the instruction issuing unit 10 supplies, to the cache memory 11, write data and a write address indicative of an address to which the write data is to be written. In the case of the memory access request being a data read request, the instruction issuing unit 10 supplies, to the cache memory 11, a read address indicative of an address from which data is to be read.

The cache memory 11 includes a cache control unit 15 and a cache-RAM-&-error-detection unit 16. The cache control unit 15 includes a TAG-LRU unit 20, a word-line-failure detecting unit 21, an error-monitor register 22, and a Del-Flag register 23. The cache-RAM-&-error-detection unit 16 includes a cache RAM 25 and an error detecting unit 26.

The word-line-failure detecting unit 21 includes a way-ID match circuit 31, a word-address match circuit 32, a column-address match circuit 33, and a word-line-failure flag (WORLDLINE-FAIL Flag) 34. The error-monitor register 22 includes an error-way register 35, an error-address register 36, and an error counter 37. The TAG-LRU unit 20 includes a TAG-RAM 38 and an LRU unit 39.

The cache memory 11 includes a plurality of cache lines, and the copying of information from the external memory device 12 to the cache memory 11 is performed on a cache-line-specific basis. The memory space of the external memory device 12 is divided in units of cache lines. The divided memory segments are sequentially assigned to the cache lines. Since the volume of the cache memory 11 is smaller than the volume of the main memory, the memory segments of the main memory are repeatedly assigned to the same cache lines.

In general, a predetermined number of lower-order bits of an address serve as an index of the cache memory, and the remaining higher-order bits serve as a tag of the cache memory. The TAG-RAM 38 stores tags corresponding to indexes. A 4-way configuration having 4 ways is used in the cache memory 11 illustrated in FIG. 1. Accordingly, four tags corresponding to four ways are stored with respect to each index. The cache memory 11 stores part of the data stored in the external memory device 12 in plural cache lines provided for a plurality of ways.

When data is to be accessed, the index portion of the address to be accessed is used to read the tags of a corresponding index provided in the TAG-RAM 38. A check is then made as to whether the retrieved tags have a matching bit pattern with the tag portion of the address. When a match is found with respect to any one of the retrieved tags, the access entails a cache hit. When no match is found with respect to any one of the retrieved tags, the access entails a cache miss.

In the case of a cache hit, cache data (data of a predetermined number of bits equal in size to one cache line) corresponding to the relevant way (for which the tag match is found) of the index of interest is accessed. In the case of a cache miss, data to be accessed that is stored in the external memory device 12 is transferred to the relevant cache line of the cache RAM 25. In so doing, all the ways of the index of interest may have valid cache data. In such a case, the data that is least needed (e.g., the data that has been least recently accessed) is replaced with the data to be accessed.

Figure 2:
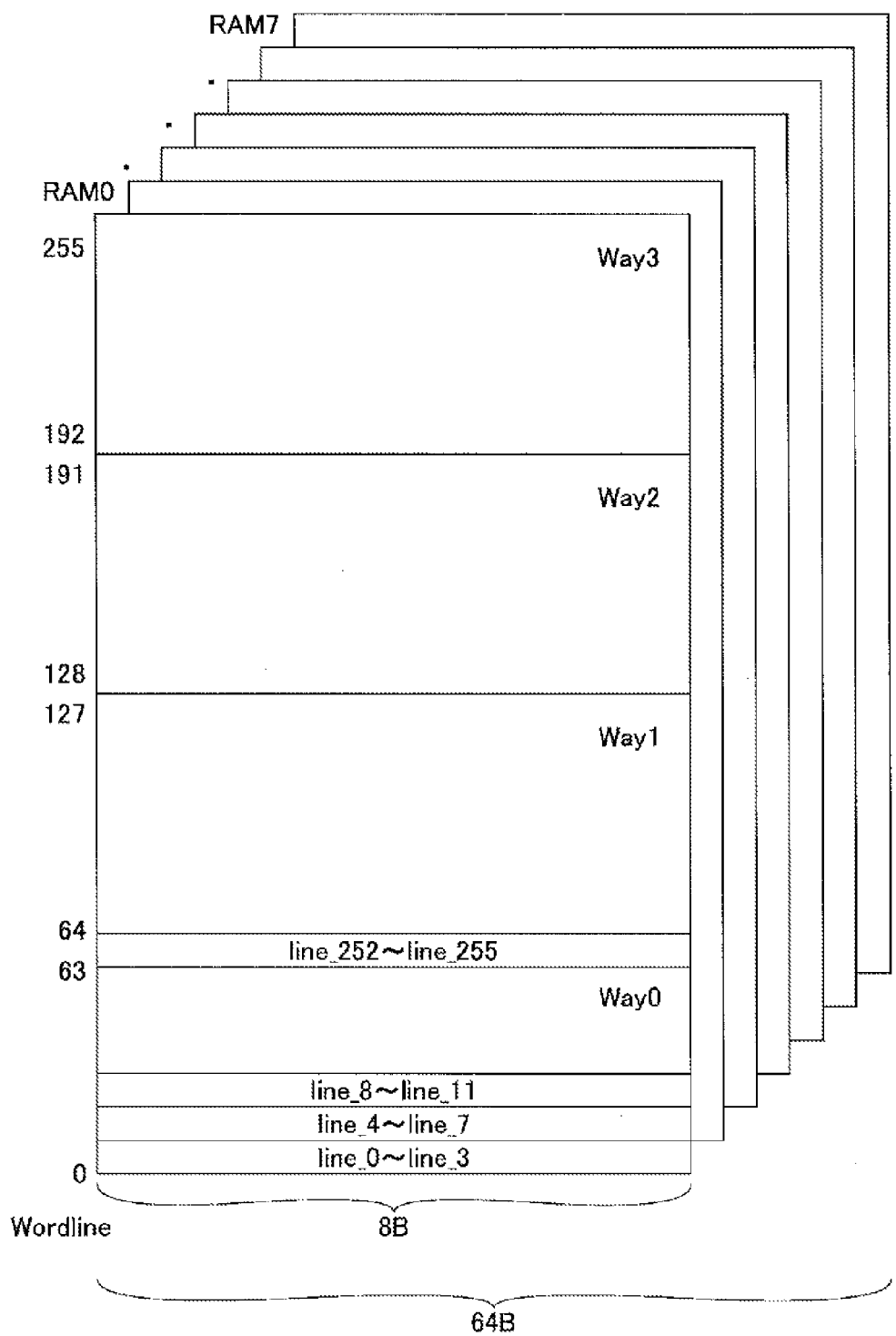
FIG. 2 is a drawing illustrating an example of the detailed configuration of a cache RAM.

FIG. 2 is a drawing illustrating an example of the detailed configuration of the cache RAM 25. The size of the cache RAM 25 may be 64 KB (kilo bytes). The cache RAM 25 may foe of a 4-way set-associative type, with one cache line being 64 B (bytes). In FIG. 2, eight RAMs RAM0 through RAM7 are provided, each being 1 K×8 B (i.e., 1024×8 bytes). Each RAM may have a configuration of 4 columns×256 word lines.

As illustrated in FIG. 2, each RAM is divided into four ways of equal size. The 0-th to 63-th word lines are used as way 0. The 64-th to 127-th word lines are used as way 1. The 128-th to 191-th word lines are used as way 2. The 192-th to 255-th word lines are used as way 3. The 64-byte data of one cache line is divided into 8-byte pieces which are distributed in eight RAMs, respectively. One word line of each RAM is divided into four columns, which correspond to four cache lines, respectively. The first word line, for example, corresponds to four cache lines line0 to line3, Accordingly, a word line to be accessed is uniquely determined based on an index and a way ID.

The error detecting unit 26 detects an error that occurs in one of the cache lines of the cache RAM 25. Specifically, the error detecting unit 26 may include a parity checker, which performs an error check with respect to data read from the cache RAM 25. The error detecting unit 26 transmits an error check result to the cache control unit 15. Namely, upon detecting an error, the error detecting unit 26 supplies a signal indicative of error detection to the cache control unit 15. Specifically, the signal applied to the cache control unit 15 indicates error detection when it is changed to an asserted state (e.g., the logic value "1").

When the error detecting unit 26 detects a first error occurring in one of the plurality of cache lines, the error-way register 35 stores error-way identification information indicative of the way to which the cache line having the first error belongs. Namely, in response to the signal indicative of error detection supplied from the error detecting unit 26, the cache control unit 15 stores a way ID indicative of the error-detected way in the error-way register 35. This way ID is the way-ID for which a tag match is found and which is transmitted from the TAG-RAM 38.

The error-address register 36 includes an error-word-address register and an error-column-address register. The error-word-address register stores the word address of the cache line in which the first error has occurred. Namely, in response to the signal indicative of error detection supplied from the error detecting unit 26, the cache control unit 15 stores the error-detected word address in the error-word-address register. This word address is part of the address supplied from the instruction issuing unit 10. The error-column-address register stores the column address of the cache line in which the first error has occurred. Namely, in response to the signal indicative of error detection supplied from the error detecting unit 26, the cache control, unit 15 stores the error-detected column address in the error-column-address register. This column address is part of the address supplied from the instruction issuing unit 10.

The way-ID match circuit 31 compares the way identification information of the cache line to be accessed with the error-way identification information stored in the error-way register 35. The way identification information of the cache line to be accessed is the tag-matched way ID transmitted from the TAG-RAM 38. The word-address match circuit 32 compares the word address of the cache line to be accessed with the error word address stored in the error-word-address register of the error-address register 36. The column-address match circuit 33 compares the column address of the cache line to be accessed with the error column address stored in the error-column-address register of the error-address register 36.

After the occurrence of the first error, the error detecting unit 26 detects a second error occurring in one of the plurality of cache lines in response to a memory access request. In this case, the cache control unit 15 disables all the cache lines sharing the error-detected word line in response to the results of comparisons performed by the way-ID match circuit 31, the word-address match circuit 32, and the column-address match circuit 33. Namely, all the cache lines sharing the error-detected word line are disabled.

In the following, a detailed description will be given of the disabling operation described above. At the time of the second-error detection, the fact that the way-ID match circuit 31 and the word-address match circuit 32 detect a match and the column-address match circuit 33 detects a mismatch indicates that the errors have occurred in different cache lines on the same word line. In this case, a predetermined value (e.g., 1) is stored in the word-line failure flag 34. In the initial state, the word-line-failure flag 34 stores a different predetermined value (e.g., 0). Upon storing 1, the word-line-failure flag 34 will not return to the state in which 0 is stored therein. When the data stored in the word-line-failure flag 34 is 1, the cache control unit 15 disables all the cache lines sharing the error-detected word line upon an error-degenerate mode being specified as a result of the occurrence of no less than a predetermined number of errors. In this disabling operation, a valid flag provided in the TAG-RAM 38 to indicate either a valid state or an invalid state of each cache data may be set to the value indicative of the invalid state. For the disabled cache lines, no cache hit will be detected in response to a subsequent access request from the instruction issuing unit 10. When the data stored in the word-line-failure flag 34 is 0, the cache control unit 15 disables the cache line experiencing a bit failure upon an error-degenerate mode being specified as a result of the occurrence of no less than a predetermined number of errors. Namely, the cache control unit 15 disables only the cache line that includes a failed bit. For the disabled cache line, no cache hit will be detected in response to a subsequent access request from the instruction issuing unit 10.

In the following, a description will be given of the operation that initiates an error degenerate mode upon the occurrence of no less than a predetermined number of errors. The error counter 37 counts the number of errors that occur in any one of the plurality of cache lines and that are detected by the error detecting unit 26. Namely, each time the error counter 37 receives the signal indicative of error detection from the error detecting unit 26, the error counter 37 increases the count by one. A predetermined value (e.g., 1) is stored in the Del-Flag register 23 upon the error count of the error counter 37 exceeding a predetermined count. The value "1" stored in the Del-Flag register 23 indicates an error degenerate mode, and initiates the disabling operation as previously described.

In the following, a description will be given of operations performed in the error degenerate mode. When the value stored in the Del-Flag register 23 is 1, an error degenerate mode is set, so that the failed cache line is made obsolete upon the occurrence of a cache miss. In this case, the cache control unit 15 replaces a way different from the way indicated by the error-way identification information in response to the results of comparisons performed by the way-ID match circuit 31, the word-address match circuit 32, and the column-address match circuit 33. Namely, upon the occurrence of a cache miss, the error way indicated by the error-way identification information stored in the error-way register 35 is not used as a way in which data from the external memory device 12 is stored. When the value stored in the word-line-failure flag 34 is 1, the cache control unit 15 performs way-replace control such as not to register data in any one of the cache lines sharing the failed word line. When the value stored in the word-line-failure flag 34 is 0, the cache control unit 15 performs way-replace control such as not to register data in the failed cache line.

In the configuration illustrated in FIG. 1, storing the number of detected errors, an error-way ID, and an error address may suffice to provide recovery from a word-line failure. The use of three registers for such data storage makes it possible to make obsolete all the cache lines sharing a failed word line upon the occurrence of a word line failure while avoiding a significant increase in circuit size. Further, a check can be made as to whether the failure is a word line failure or a one-bit failure, so that a proper disabling operation can be performed depending on the type of the failure. This arrangement can avoid making obsolete a properly operating cache line, thereby reducing a performance drop to a necessary minimum.

Figure 3:
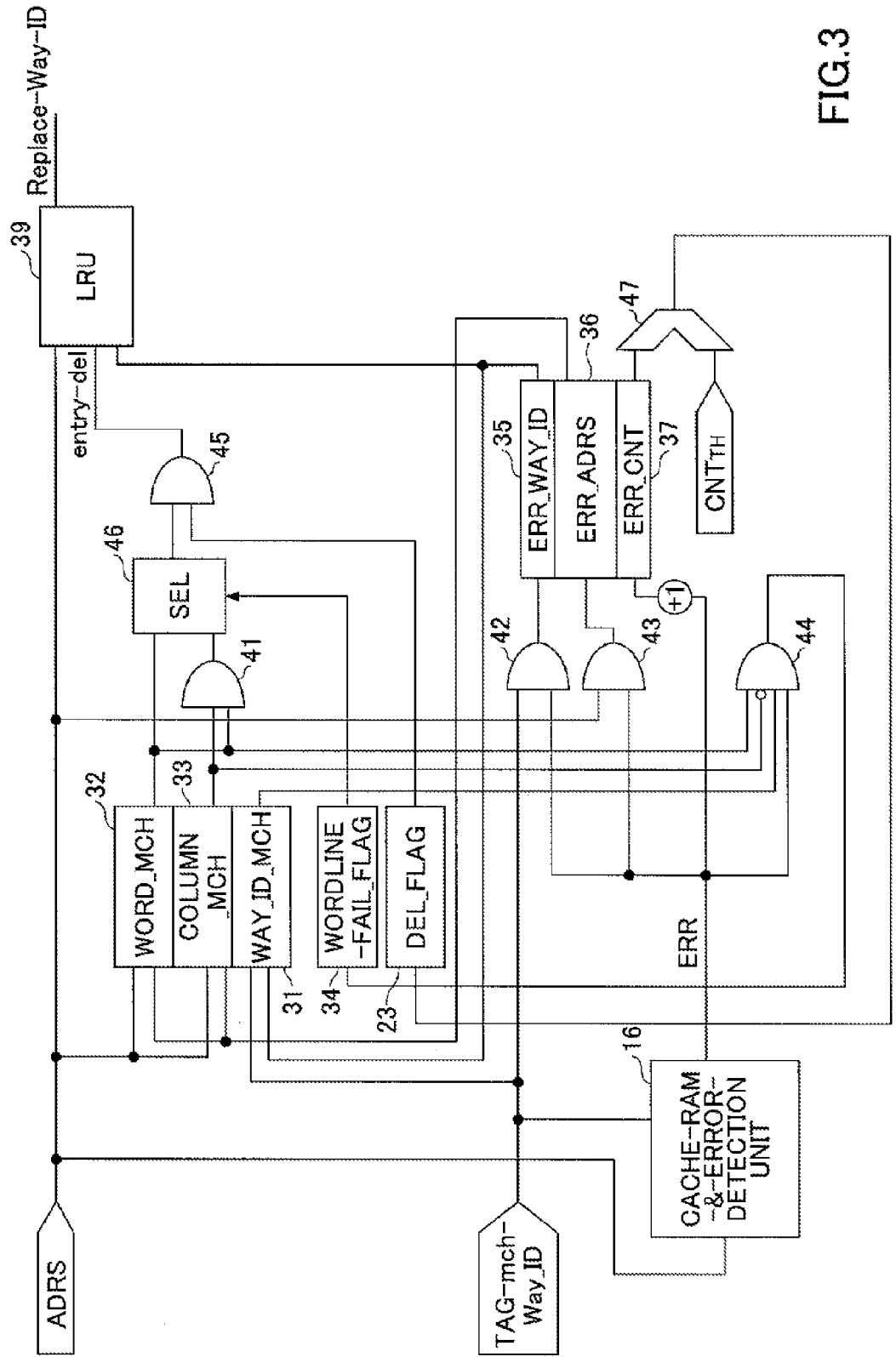
FIG. 3 is a drawing illustrating the configuration used for controlling an error-monitor register, a Del-Flag register, and a word-line-failure flag as well as for specifying the way that is to be replaced.

FIG. 3 is a drawing illustrating the configuration used for controlling the error-monitor register 22, the Del-Flag register 23, and the word-line-failure flag 34 as well as for specifying the way that is to be replaced. In FIG. 3, the same or corresponding elements as those of FIG. 1 are referred to by the same or corresponding numerals, and a description thereof will be omitted as appropriate.

In FIG. 3, the error detection signal is supplied from the cache-RAM-&-error-detection unit 16 to AND gates 42 through 44 and to the error counter 37. In the error counter 37, the count increases by one each time the error detection signal is supplied, i.e., each time the error detection signal is asserted. The AND gate 42 performs an AND operation between the error detection signal and the tag-matched way ID (TAG-mch-Way-ID) supplied from the TAG-RAM 38. When the error detection, signal is "1" indicative of error detection, the error-way ID output from the AMD gate 42 is stored in the error-way register 35. The AND gate 43 performs an AND operation between the error detection signal and an address ADRS that is to be accessed. When the error detection signal is "1" indicative of error detection, the failed-address address values (i.e., a word address and a column address) output from the AND gate 43 are stored in the error-address register 36.

The AND gate 44 receives the output of the word-address match circuit 32, an inverse of the output of the column-address match circuit 33, the output of the way-ID match circuit 31, and the error detection signal, and perform an AND operation between them. When the output of the AND gate 44 becomes 1, the value "1" is stored in the word-line-failure flag 34.

A comparator 41 compares the count value output from the error counter 37 with a predetermined threshold value $CNT_{TH}$. The comparator 47 asserts its output when the count value exceeds the predetermined threshold. In response to the assertion of the output of the comparator 47, the Del-Flag register 23 stores "1" therein. When the Del-Flag register 23 stores "1" therein, the disabling operation as previously described is also performed. In the configuration illustrated in FIG. 3, only the cache line for which the latest error is detected by the error detecting unit 26 is disabled in response to the results of comparisons performed by the way-ID match circuit 31, the word-address match circuit 32, and the column-address match circuit 33. Namely, the data stored in the error-way register 35 and the error-address register 36 indicate the latest error that was detected, and the disabling operation is performed based on such data, so that only the cache line in which the latest error is detected is disabled. This is the operation that, is performed where no word line failure has been detected. Where a word line failure has been detected, all the cache lines sharing the word line in which the latest error was detected are disabled.

The stored value of the word-line-failure flag 34 is supplied to a selector 46 as a selection signal.

The selection signal that is "1" causes the selector 46 to select the output, of the word-address match circuit 32.

The selection signal that is "0" causes the selector 46 to select the output of an AND gate 41. The AND gate 41 outputs a value obtained by performing an AND operation between the output of the word-address match circuit 32 and the output of the column-address match circuit 33. The selector 46 provides the selected value to the AND gate 45. Where the stored value of the Del-Flag register 23 is "1", the AND gate 45 provides the output of the selector 46 to the LEU unit 39 as an error-way-avoidance signal "entry-del". Upon receiving the error-way-avoidance signal "entry-del", the LRU unit 39 selects a way to be replaced by selecting a way other than the way indicated by the error-way ID supplied from the error-way register 35.

In this manner, a predetermined value (e.g., 1) is stored in the Del-Flag register 23 upon the error count of the error counter 37 exceeding a predetermined count, thereby initiating an error degenerate mode. When the value stored in the Del-Flag register 23 is 1, an error degenerate mode is set, so that the failed cache line is made obsolete upon the occurrence of a cache miss. When the value stored in the word-line-failure flag 34 is 1, the output of the word-address match circuit 32 is supplied to the LRU unit 39 as the error-way-avoidance signal "entry-del". Accordingly, in the case of a word line failure, a decision as to whether to avoid the way indicated by the error-way ID is made in response to the result of a check that is made as to whether the word address to be accessed matches the failed word address. When the value stored in the word-line-failure flag 33 is 0, the result of an AND operation between the output of the word-address match circuit 32 and the output of the column-address match circuit 33 is supplied to the LRU unit 39 as the error-way-avoidance signal "entry-del". Accordingly, in the case of no word line failure, a decision as to whether to avoid the way indicated by the error-way ID is made in response to the result of a check chat is made as to whether the word address and column address to be accessed match the failed word address and the failed column address, respectively.

Figure 4:
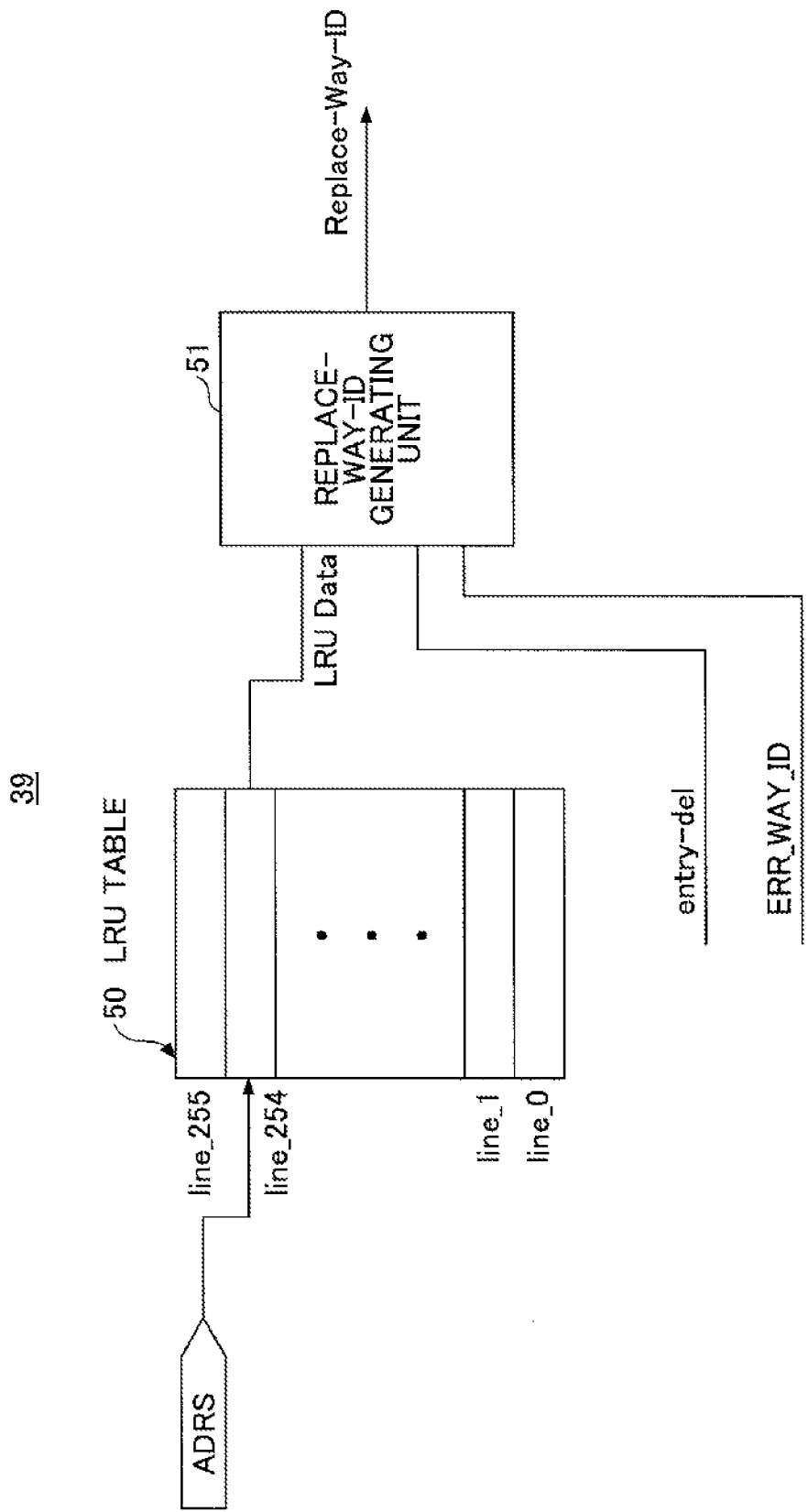
FIG. 4 is a drawing illustrating an example of the configuration of an LRU unit.

FIG. 4 is a drawing illustrating an example of the configuration of the LRU unit 39. The LRU unit 39 illustrated in FIG. 4 includes an LRU table 59 and a replace-way-ID generating unit 51. The LRU table 50 stores data indicative of the order in which the ways were accessed on an index-by-index basis (i.e., cache-line-by-cache-line basis). For example, stored LRU data may indicate "3, 0, 2, 1" with respect to the 254-th cache line line-254. This LRU data indicates that way 3 was accessed last, that way 0 was accessed last other than way 3, that way 2 was accessed last other than ways 3 and 0, and that way 1 was accessed least recently. The LRU table 50 receives the address ADRS to be accessed, and outputs LRU data of the index corresponding to the received address. The replace-way-ID generating unit 51 outputs a way ID to be replaced, based on the LRU data supplied from the LRU table 50. Specifically, where the error-way-avoidance signal "entry-del" is 0, the replace-way-ID generating unit 51 outputs a way ID that has been least recently accessed (i.e., the way for which the longest time has passed since the way was last accessed). Where the error-way-avoidance signal "entry-del" is 1, the replace-way-ID generating unit 51 outputs the way ID of the way that has been least recently accessed among the ways other than the error way indicated by ERR_WAY_ID.

Figure 5:
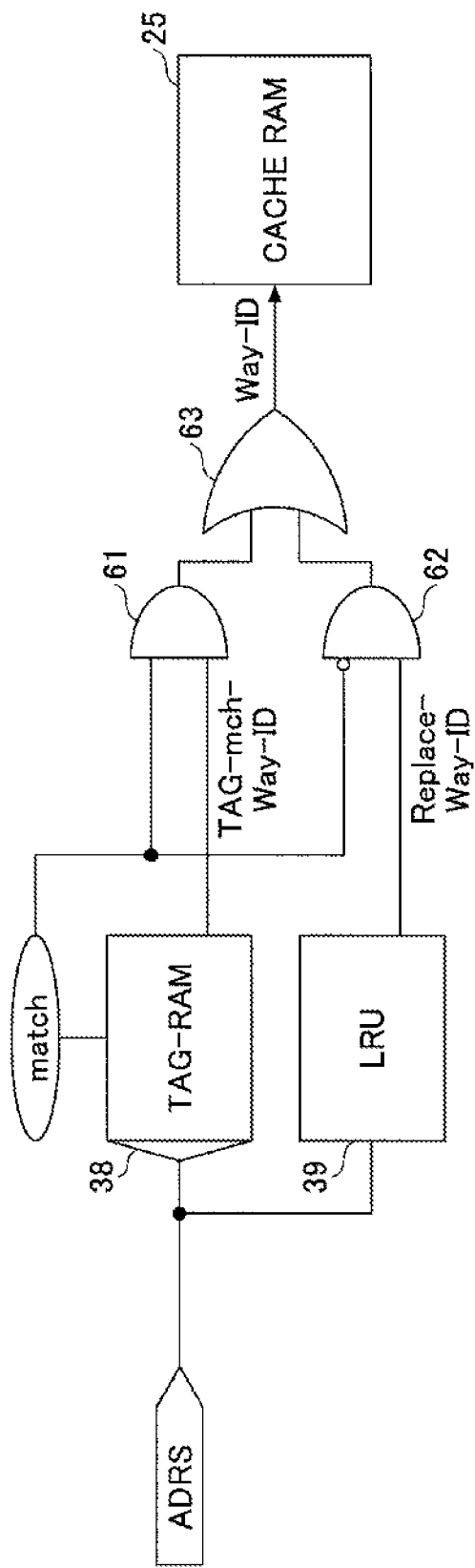
FIG. 5 is a drawing illustrating an example of the configuration used for generating a way ID supplied to the cache RAM based on the output of a TAG-RAM and the output of the LRU unit.

FIG. 5 is a drawing illustrating an example of the configuration used for generating a way ID supplied to the cache RAM 25 based on the output of the TAG-RAM 38 and the output of the LRU unit 39. In FIG. 5, the same or corresponding elements as those of FIG. 1 are referred to by the same or corresponding numerals, and a description thereof will be omitted as appropriate.

The configuration illustrated in FIG. 5 includes the TAG-RAM 33, the LRU unit 39, AND gates 61 and 62, and an OR gate 63. A match between the tag of the address to be accessed and a tag registered in the TAG-RAM 33 results in a match signal "match" being 1. Also, the tag-matched way ID TAG-mch-Way-ID is output. Since the match signal "match" is 1, TAG-mch-Way-TD passes through the AND gate 61 to be supplied to the cache RAM 25 through the OR gate 63. Namely, in the case of a cache hit, the tag-matched way ID is supplied to the cache RAM 25.

No match between the tag of the address to be accessed and any tag registered in the TAG-RAM 38 results in the match signal "match" being 0. The LRU unit 39 outputs a to-bereplaced way ID Replace-Way-ID. Since the match signal "match" is 0, Replace-Way-ID passes through the AND gate 62 to be supplied to the cache RAM 25 through the OR gate 63. Namely, in the case of a cache miss, the to-be-replaced way ID is supplied to the cache RAM 25.

Figure 6:
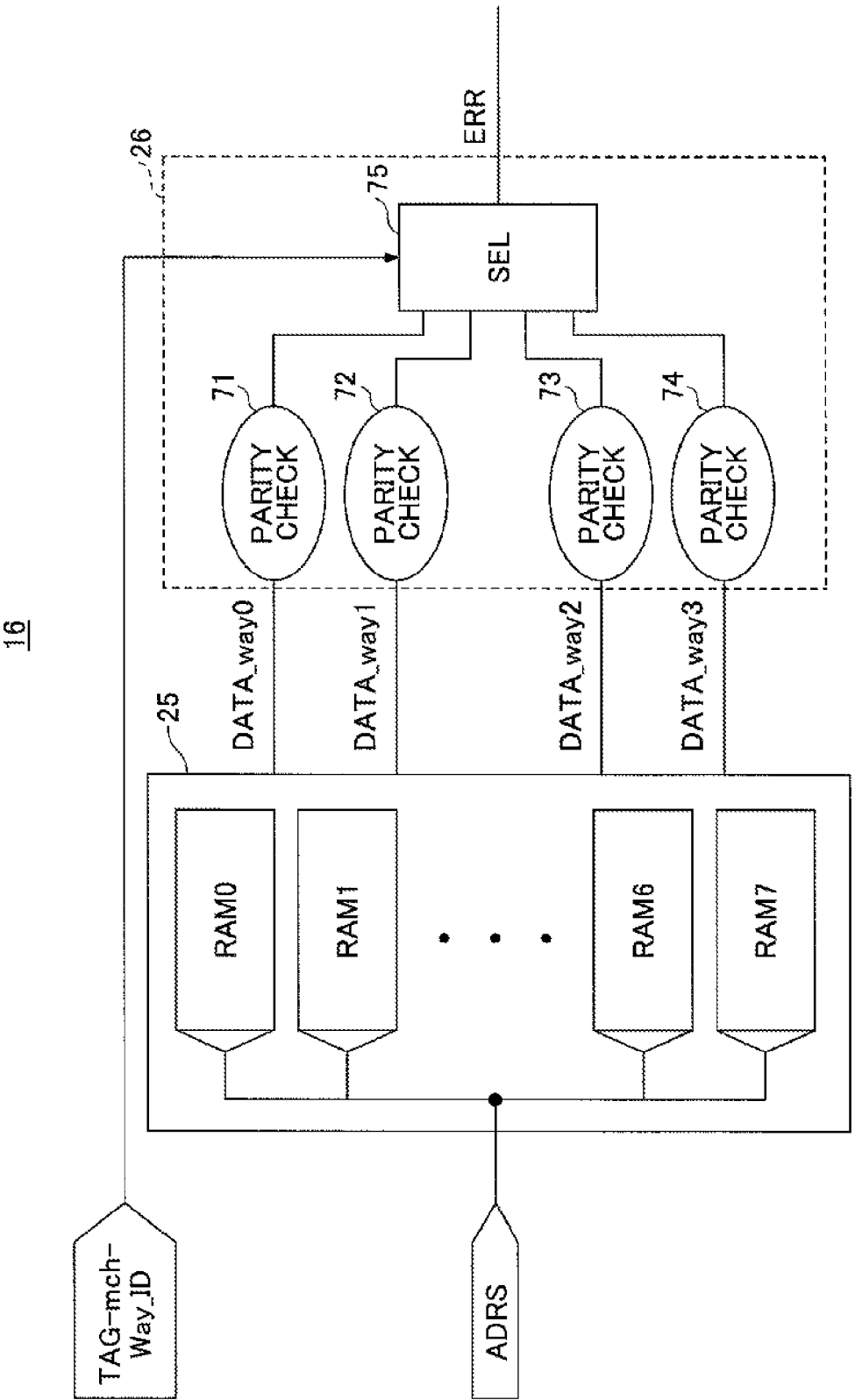
FIG. 6 is a drawing illustrating an example of the configuration of a cache-RAM-&-error-detection unit.

FIG. 6 is a drawing illustrating an example of the configuration of the cache-RAM-&-error-detection unit 16. In FIG. 6, the same or corresponding elements as those of FIG. 1 are referred to by the same or corresponding numerals, and a description thereof will be omitted as appropriate. The cache-RAM-&-error-detection unit 16 includes a cache RAM 25 and an error detecting unit 26. The cache RAM 25 includes memories RAM0 through RAM7 corresponding to the memories RAM0 through RAM7 illustrated in FIG. 2. The error detecting unit 26 includes parity check units 71 through 74 and a selector 75. In the case of 3 read access, the cache RAM 25 receives an address to be accessed, and outputs data corresponding to the received address from each of the four ways. The parity check units 71 through 74 perform parity checks with respect to the four output data, respectively. The results of the parity checks are supplied to the selector 75. The selector 75 receives the tag-matched way ID TAG-mch-Way-ID as a selection signal, and selects the result of a parity check corresponding to the way indicated by the selection signal. This parity check result is supplied as the error detection signal to the cache control unit 15 (see FIG. 1).

In the arithmetic processing apparatus described above, the cache line for which the latest error was detected is made obsolete. However, the latest error may be a soft error that is caused by the reversal of stored data due to the arrival of a cosmic ray. Since the probability of such an event is extremely low, it is safe to say that the arithmetic processing apparatus described above can properly recover from a word line failure. Should such a soft error occurs, however, a cache line different from the failed word line may be made obsolete, failing to make obsolete the failed cache line. It is preferable to make obsolete the failed cache line without failure.

Figure 7:
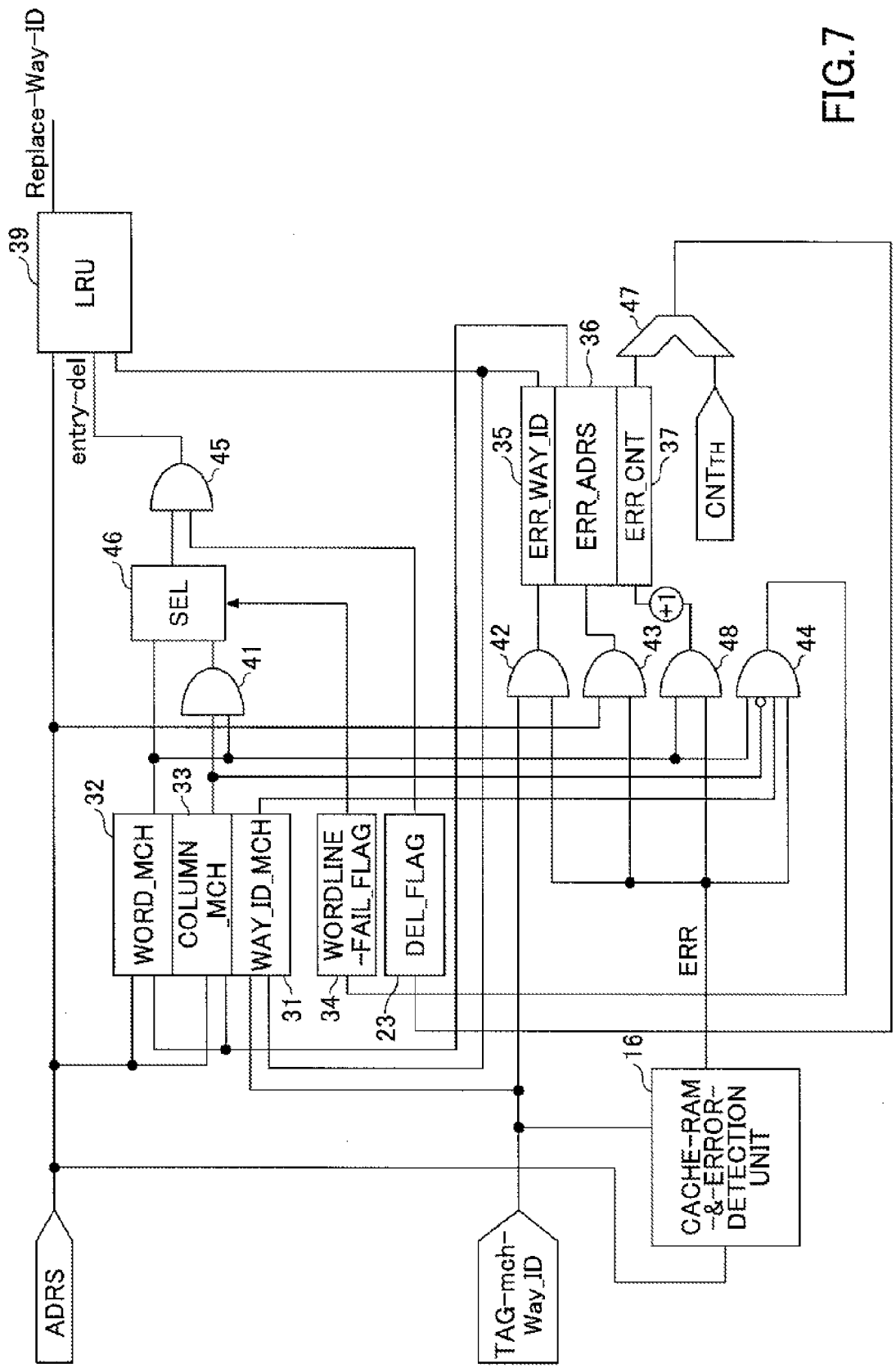
FIG. 7 is a drawing illustrating an example of the configuration that can make obsolete a failed cache line without failure.

FIG. 7 is a drawing illustrating an example or the configuration that can make obsolete a failed cache line without failure. In FIG. 7, the same or corresponding elements as those of FIG. 3 are referred to by the same or corresponding numerals, and a description thereof will be omitted as appropriate. In the configuration illustrated in FIG. 7, an AND gate 48 is situated on a path along which the error detection signal is supplied from the cache-RAM-terror-detection unit 16 to the error counter 37. The AND gate 48 performs an AND operation between the output of the word-address match circuit 32 and the error detection signal from the cache-RAM-&-error-detection unit 16, and outputs the result of the AND operation. The output of the AND gate 48 is supplied to the error counter 37, so that the count of the error counter 37 increases by one each time the output of the AND circuit 48 is asserted. Accordingly, the count of the error counter 37 increases only when an error is detected while the word address to be accessed matches the failed word address stored in the error-address register 36. Namely, the count counted by the error counter 37 indicates the number of detected errors that occur with respect to the same word address. A soft error occurring with respect to another word address is not counted. When a degenerate mode is initiated upon the count exceeding the predetermined threshold value $CNT_{TH}$, the latest detected error is never a soft error that has occurred with respect to a word address different from the failed word address.

After the degenerate mode is initiated, a soft error may occur. Upon detecting this soft error, the data stored in the error-way register 35 and the error-address register 36 may be changed. In order to avoid this, each of the AND gates 42 and 43 may be configured as a three-input gate, with an inverse of the output of the Del-Flag register 23 being applied to the third input. With this configuration, the error-way register 35 and the error-address register 36 will not be updated after the Del-Flag register 23 stores "1" therein to initiate the degenerate mode. Namely, the failed word line can properly be kept obsolete despite the subsequent occurrence of soft error.

According to at least one embodiment, an arithmetic processing apparatus that can properly recover from a word line failure is provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An arithmetic processing apparatus for connection to a memory device that stores data, the arithmetic processing apparatus comprising;
   an instruction processing unit to output a memory access request;
   a cache memory to store part of data stored in the memory device in plural cache lines provided for a plurality of ways;
   an error detecting unit to detect an error occurring in one of the cache lines;
   an error-way register to store error-way identification information indicative of a way to which a cache line having a first error belongs when the error detecting unit detects the first error occurring in the cache line that is one of the cache lines;
   an error-word-address register to store an error word address that is a word address of the cache line having the first error;
   an error-column-address register to store an error column address that is a column address of the cache line having the first error;
   a way comparing unit to compare way identification information of a cache line to be accessed with the error-way identification information;
   a word comparing unit to compare a word address of the cache line to be accessed with the error word address;
   a column comparing unit to compare a column address of the cache line to be accessed with the error column address; and
   a control unit to disable all cache lines sharing a failed word line in response to results of comparisons made by the way comparing unit, the word comparing unit, and the column comparing unit when the error detecting unit detects a second error occurring in any one of the cache lines in response to the memory access request after the occurrence of the first error.

2. The arithmetic processing apparatus as claimed in claim 1, wherein the control unit further disables a cache line having a bit failure in response to results of comparisons made by the way comparing unit, the word comparing unit, and the column comparing unit.

3. The arithmetic processing apparatus as claimed in claim 1, wherein the control unit disables only a cache line having a latest error detected by the error detecting unit in response to results of comparisons made by the way comparing unit, the word comparing unit, and the column comparing unit.

4. The arithmetic processing apparatus as claimed in claim 1, further comprising a counting unit to count a number of errors that occur in any one of the cache lines and that are detected by the error detecting unit, wherein the control unit replaces a way different from the way indicated by the error-way identification information among the plurality of ways in response to results of comparisons made by the way comparing unit, the word comparing unit, and the column comparing unit, upon the error count of the counting unit exceeding a predetermined value.

5. The arithmetic processing apparatus as claimed in claim 1, further comprising a counting unit to count a number of errors that occur in a same one of the cache lines and that are detected by the error detecting unit, wherein the control unit replaces a way different from the way indicated by the error-way identification information among the plurality of ways in response to results of comparisons made by the way comparing unit, the word comparing unit, and the column comparing unit, upon the error count of the counting unit exceeding a predetermined value.

6. A method of controlling an arithmetic processing apparatus that is connected to a memory device storing data and that includes an instruction processing unit to output a memory access request and a cache memory to store part of the data stored in the memory device in plural cache lines provided for a plurality of ways, the method comprising:

detecting a first error occurring in a cache line that is one of the cache lines;

storing, in an error-way register in response to the detection of the first error, error-way identification information indicative of a way to which the cache line having the first error belongs;

storing, in an error-word-address register in response to the detection of the first error, an error word address that is a word address of the cache line having the first error;

storing, in an error-column-address register in response to the detection of the first error, an error column address that is a column address of the cache line having the first error;

detecting a second error occurring in any one of the cache lines; and disabling, in response to the detection of the second error, all cache lines snaring a failed word line in response to a first result obtained by comparing way identification information of a cache line to be accessed with the error-way identification information, a second result obtained by comparing a word address of the cache line to be accessed with the error word address, and a third result obtained by comparing a column address of the cache line to be accessed with the error column address.

\* \* \* \* \*